United States Patent Office 3,428,177
Patented Feb. 18, 1969

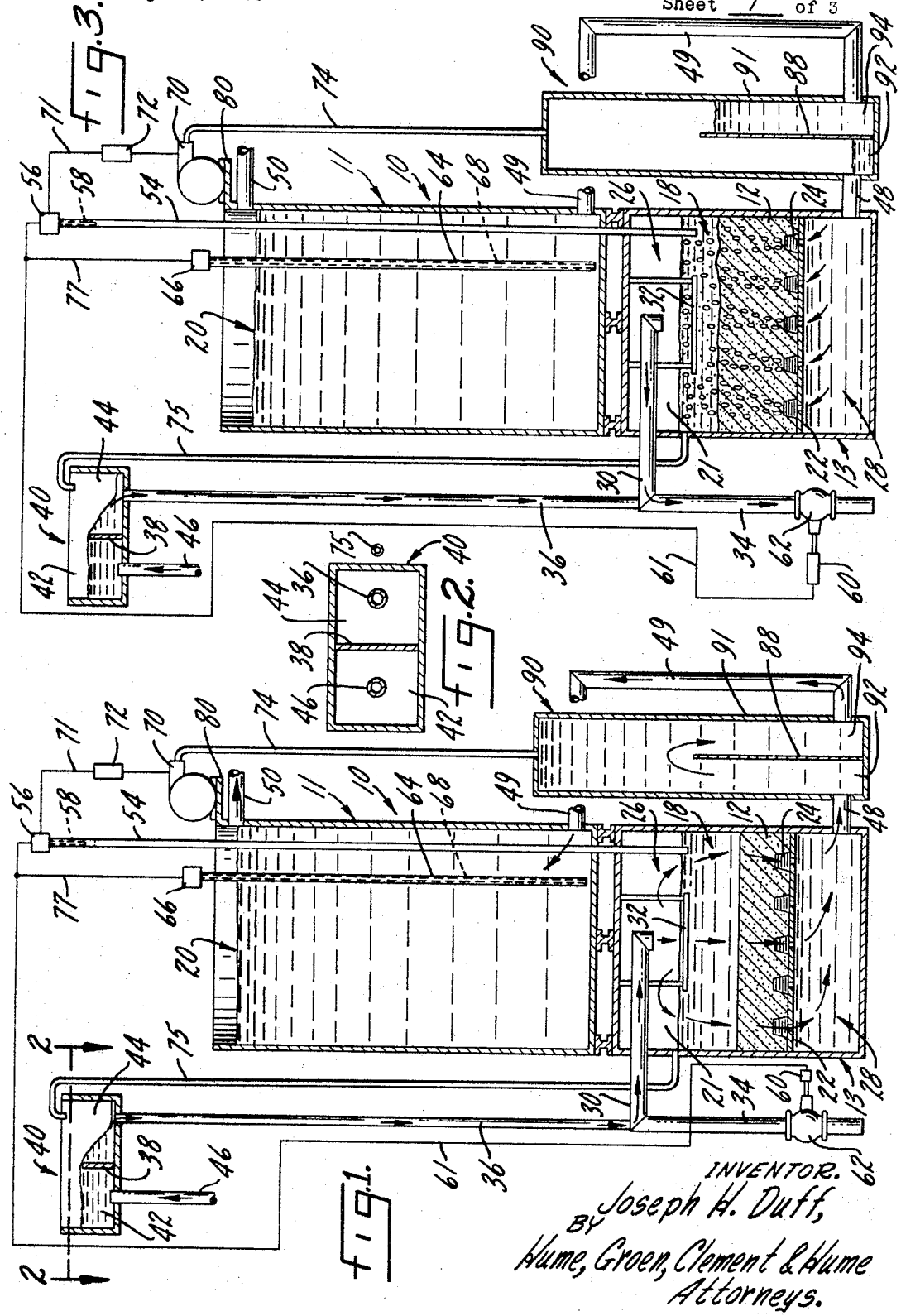

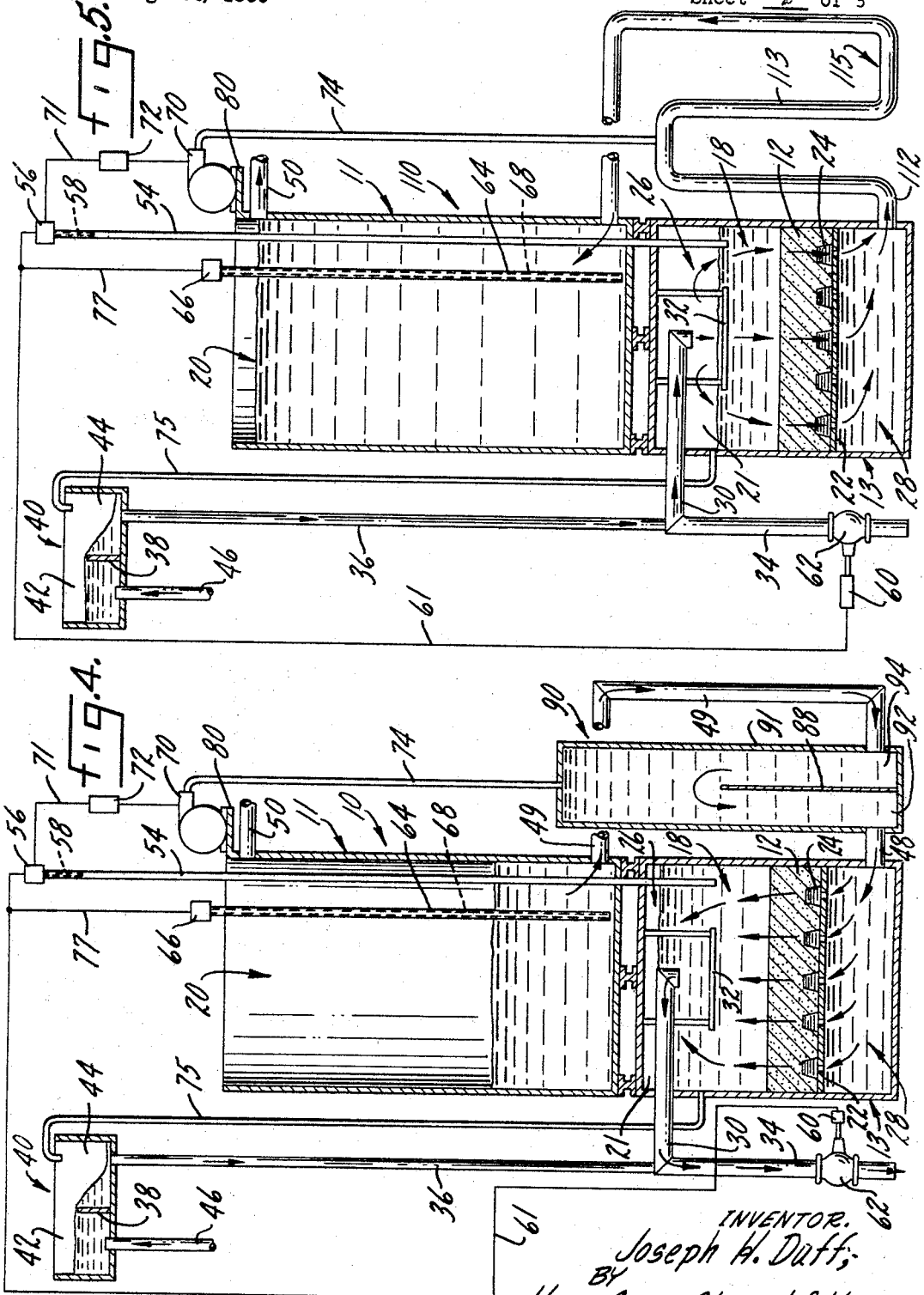

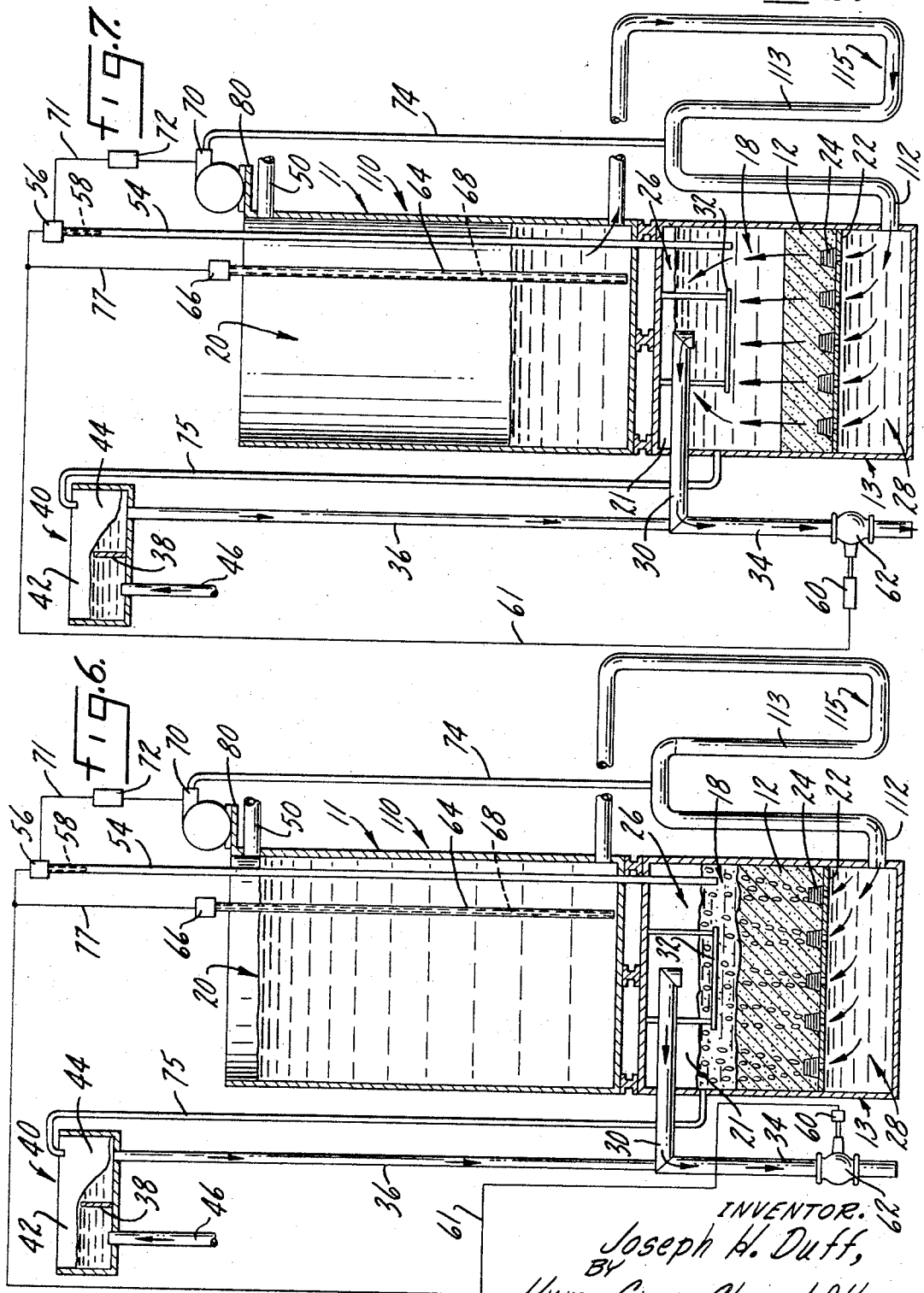

3,428,177
FLUID CONTROL MEANS FOR FILTER BACK-
WASHING AND AIR SCOURING
Joseph H. Duff, Basking Ridge, N.J., assignor to Union
Tank Car Company, Chicago, Ill., a corporation of
Delaware
Filed Aug. 24, 1966, Ser. No. 574,732
U.S. Cl. 210—108                    6 Claims
Int. Cl. B01d 23/24

ABSTRACT OF THE DISCLOSURE

The invention provides fluid control means incorporated into a self-backwashing filter of the type providing a service cycle, a gas scouring cycle, and a backwash cycle, and including a filter tank, a backwash storage tank and means for providing a pressurized scouring gas. The filter tank has an upper inlet side and a lower outlet side with a filter bed between them. The invention provides flow control means which prevent the flow of backwash water during the gas scouring cycle without requiring a valve. Basically, a first embodiment of the flow control means includes a closed tank having a weir therein forming a first and second compartments. A first pipe is connected between the first compartment and the lower outlet side of the filter tank, and a second pipe is connected between the second compartment to the backwash storage tank. Means for providing a scouring gas under pressure also communicate with the control tank. The weir is of a height low enough to permit flow of the backwash liquid, but high enough to provide a pressure head equal to the pressure head of the backwash liquid in the storage tank minus the pressure of the gas during the scouring cycle. In a second embodiment, an inverted U-shaped pipe is substituted for the control tank, so that the uppermost portion of the U-shaped section in effect forms two compartments, and performs the same function as the aforementioned weir means.

---

This invention relates to an apparatus for filtering liquids with a filter bed and, more particularly, to a filtering apparatus having means to gas scour and backwash the filter bed.

A typical method of filtering a liquid is to pass the untreated or raw liquid through a filter chamber having a filter bed of suitable filter media, such as sand or other granular material well known in the art. The untreated liquid is passed into the inlet side of the filter chamber and as the liquid passes through the filter bed suspended matter in the liquid is removed. The filtered or treated liquid passes to the outlet side of the filter chamber through a suitable false bottom in the filter chamber to an underdrain compartment. The false bottom is designed to retain the filter bed but allow the filtered liquid to pass therethrough to the underdrain compartment. The filtered liquid passes from the underdrain compartment to the service line through suitable conduits.

After a period of time the filter bed becomes clogged and fouled with solid, foreign material removed from the untreated liquid during filtration and, accordingly, becomes less efficient. As the filter bed becomes clogged, the pressure differential between the upstream side and the downstream side of the filter bed increases. Thus, the head loss or increased pressure drop across the filter bed can be used as a means to determine when the filter bed should be cleaned.

One method of cleaning the filter bed is to backwash the bed with filtered liquid. This step involves introducing a reverse flow of filtered liquid through the filter bed to carry the foreign matter in the filter bed to waste. Some materials filtered from the raw liquid are sticky in nature and tend to adhere to the filter media and simple backwashing is not sufficiently effective to clean the bed after the filtering cycle. This has been recognized in the art for many years. To overcome these deficiencies, a gas cleaning or scouring cycle, surface washer, or sub-surface washer, has been utilized before the backwashing cycle. In such a gas cleaning or scouring cycle, air or other suitable gas under pressure is introduced into the underdrain compartment of the filter chamber and passed upwardly through the filter bed. As the air passes through the filter bed, it violently agitates the filter media and thereby dislodges foreign material in the filter bed and foreign material on the filter media. The backwash liquid then removes the foreign material from the filter chamber.

Heretofore such filtering equipment required a control valve in the line interconnecting the underdrain compartment of the filter chamber with the service line and the backwash storage compartment, as described and illustrated in co-pending application Ser. No. 320,149, filed Oct. 30, 1963, now U.S. Patent No. 3,260,366 assigned to the assignee of the present application. This control valve was operated with automatic control means, though it could be operated manually. In any event, this valve increases the capital expenditure and maintenance requirements of the filter. It would therefore be desirable to replace this control valve with less expensive means having reduced maintenance requirements.

Accordingly, it is an object of the present invention to provide a gas scouring filter system which does not require a valve in the line interconnecting the underdrain compartment of the filter chamber with the service line and the supply of backwash water.

It is another object to provide an apparatus for filtering a liquid with a filter bed wherein gas scouring of the filter bed may be effected.

It is a further object to provide an apparatus for filtering a liquid containing solid impurities.

It is a still further object to provide a system for gas scouring a filter bed of a filter chamber.

The invention, both as to its organization and method of operation, taken with further objects and advantages thereof, will be understood by reference to the following description taken in conjunction with the accompanying drawings, in which:

FIGURE 1 is a side elevational view, partially in section, illustrating a filter system embodying the features of the present invention, the filter system being illustrated during the filtering or service cycle;

FIGURE 2 is a cross-sectional view of the inlet head box of the filter system of FIGURE 1 taken along line 2—2 of FIGURE 1;

FIGURE 3 is a side elevational view, partially in section, illustrating the filter system of FIGURE 1 during the gas scouring cycle;

FIGURE 4 is a side elevational view, partially in section, illustrating the filter system of FIGURE 1 during the backwash cycle;

FIGURE 5 is a side elevational view, partially in section, illustrating another filter system embodying the features of the present invention, the filter system being illustrated during the service cycle;

FIGURE 6 is a side elevational view, partially in section, illustrating the filter system of FIGURE 5 during the gas scouring cycle; and FIGURE 7 is a side elevational view, partially in section illustrating the filter system of FIGURE 5 during the backwash cycle.

Referring now to the drawing, and more particularly to FIGURES 1 and 2, there is illustrated a filtering system embodying the features of the present invention and including a filter 10, a head box 40, an air blower 70 and a flow control means 90. The filter 10 is of the type described and illustrated in co-pending application Ser. No. 320,149, filed Oct. 30, 1963, now U.S. Patent No. 3,260,-366 and assigned to the assignee of the present application. The filter 10 has a filter bed 12 of filter media through which the raw liquid is passed during the service or filtering cycle to remove solid foreign materials therefrom. Filtered or treated water from the filter 10 is passed to service. After the filter bed 12 has become clogged with foreign particles removed from the raw liquid, a gas scouring cycle is automatically initiated to pass air upwardly through the filter bed 12 to dislodge foreign matter in the filter bed 12 and on the filter media. After the filter bed 12 has been gas scoured, the filter bed 12 is backwashed with treated liquid to remove the foreign material from the filter bed 12. The filter 10 is then ready to begin the filtering cycle again.

More specifically, the filter 10 comprises an upper, open cylindrical tank 11 mounted by suitable means upon a lower, closed cylindrical tank 13. The tank 11 forms a backwash storage chamber 20 while the tank 13 forms a filter chamber 18. The filter bed 12 of suitable filter media, such as sand or the like, is situated in the filter chamber 18 on a false bottom member 22 with a strainer means 24, as is well known in the art. In this manner, an inlet compartment 26 and an underdrain compartment 28 are formed above and below, respectively, the filter bed 12 in the filter chamber 18.

A transfer conduit 30 extends into and communicates with the inlet chamber 26 to carry raw liquid into the filter chamber 18. As will be more apparent hereinafter, the transfer conduit 30 is also utilized to remove backwash liquid and scouring gas from the filter chamber 18 and the inlet chamber 26. Within the inlet chamber 26 there is mounted a baffle 32 which functions to distribute incoming raw liquid from the transfer conduit 30 evenly across the filter bed 12. Thus, during the service cycle, raw liquid from the transfer conduit 30 flows past the baffle 32 into the filter chamber 18 and through the filter bed 12 and the strainers 24 into the underdrain compartment 28. The insoluble materials suspended in the raw liquid are thereby extracted and retained in the filter bed 12.

An inlet pipe 36 is connected to the transfer conduit 30 and extends upwardly to a height above the backwash storage chamber 20. The inlet pipe 36 is connected to an overflow weir-type inlet head box 40. The inlet head box 40 is a rectangular tank having a weir or partition 38 dividing the tank into compartments 42 and 44. A pipe 46 for raw liquid communicates with the compartment 42 and transfers the raw liquid into the compartment 42. The raw liquid overflows the weir 38 into the chamber 44 and the inlet pipe 36. As the raw liquid overflows or cascades over the weir 38, air is entrained in the raw liquid.

The raw liquid, therefore, passes from a suitable source through the line 46 into the chamber 42 of the inlet head box 40, overflows the weir 38 and passes through the chamber 44, the inlet pipe 36 and the transfer conduit 30 to the inlet chamber 26. The raw liquid passes through the filter bed 12 and the treated water is recovered in the underdrain compartment 28. The treated water passes from the underdrain compartment to a connecting duct 48 which communicates with the bottom of the flow control means 90. The flow control means 90 includes a closed tank 91 having a weir partition 88 which divides the lower portion thereof into two compartments 92 and 94. The duct 48 communicates with the compartment 92. The filtered liquid passes from the duct 48 into the compartment 92 of the flow control means 90, over the weir 88 and into the compartment 94. A duct 49 connects the lower portion of the compartment 94 with the lower portion of the backwash storage chamber 20, communicating with the backwash storage chamber at an opening forming a filtrate inlet and backwash outlet. Accordingly, the filtered liquid passes from the compartment 94 through the duct 49 into the backwash storage chamber 20. A service outlet pipe 50 communicates with the top of the backwash storage chamber 20. The backwash storage chamber 20 fills until the filtered liquid reaches a level of the service outlet pipe 50, at which time the treated liquid passes to the service outlet pipe 50. The liquid in the backwash storage chamber 20 is used to clean the filter bed 12 during the backwash cycle.

A high level control pipe 54 communicates with the inlet chamber 26 of the filter chamber 18. The control pipe 54 is a vertically extending pipe extending through the backwash storage chamber 20, as shown in the drawings, or positioned outside the filter 10. At its upper end, which extends above the high liquid level in the backwash storage chamber 20, the high level control pipe 54 has a high level sensing switch 56 with a probe 58. This switch 56 is actuated when liquid, rising in the high level pipe 54, contacts the probe 58. The point at which the high level control switch 56 is actuated represents a predetermined pressure drop across the filter bed 12.

The high level control switch 56 is electrically connected with an electrical actuating means 60, as indicated diagrammatically by line 61. The electrical actuating means 60 is in turn connected to and mechanically controls the opening and closing of a butterfly valve 62 or the like positioned in a backwash line 34 connected to the inlet pipe 36 and the transfer conduit 30. The high level control switch 56 is also electrically connected with an on-off switch means 72, as indicated diagrammatically by line 71, which actuates the air blower 70. A suitable pipe line 74 connects the air blower 70 with an upper portion of the seal tank 90.

The air blower 70, the selection of which is a matter of choice within the ordinary skill of one in the art, is mounted upon a platform 80 attached to the tank 11 and is positioned above the level at which the service outlet pipe 50 communicates with the backwash storage chamber 20, i.e., above the uppermost level reached by the liquid in the tank 11, to prevent liquid from entering the blower 70. Preferably, the blower 70 is positioned above the level the liquid could obtain in the filter system if operational failures occurred. For example, in the illustrated filter system it would be preferable to have the blower 70 positioned above the inlet head box 40 since liquid could not rise above that level even if, for some reason, the valve 62 and the service line are closed at the same time. The on-off switch means 72, which are well known in the art, is actuated automatically by the high level control switch 56. When so actuated the air blower 70 operates for a predetermined period of time and then automatically shuts itself off. The air output pressure of the blower 70 when operating has been adjusted so that it is greater than the liquid head in the underdrain compartment 28 during the gas scouring cycle when the valve 62 is open and also great enough to prevent backwash water from passing from the backwash storage means 20 over the weir 88 into the filter tank 13. In this manner air from the air blower 70 will pass through the flow control means 90 into the underdrain compartment 28 and upwardly through the bed 12 during the gas scouring cycle.

When the high level sensing switch 56 is actuated, an electrical impulse is transferred to the electrical actuating means 60 and the on-off switch means 72. This causes the electrical actuating means 60 to open the valve 62 rapidly. Simultaneously, the on-off switch means 72 actuates the air blower 70. The filter 10 goes through the gas scouring cycle (FIGURE 3) wherein air from the air blower 70 passes through suitable conduit means such as a line 74, the flow control means 90 and the duct 48 and upwardly through the filter bed 12 to dislodge foreign material therein. The air passes out of the filter chamber 18 through the transfer conduit 30 (and the line 34) and a vent tube 75 as will be explained more fully hereinafter.

After a predetermined period of time, the air blower 70 shuts off. The backwash cycle begins.

During the backwash cycle (FIGURE 4), the filtered liquid in the backwash storage compartment 20 will flow out of the filtrate inlet and backwash outlet opening through the connecting duct 49 into the flow control means 90 and over the weir 88 into the duct 48 and the underdrain compartment 28 of the filter chamber 18. The backwash liquid is under sufficient pressure so that it flows upwardly through the filter bed 12 and passes through the transfer conduit 30 to the inlet pipe 36 and out to drain through the backwash pipe 34 and the valve 62. The backwash liquid carries the foreign matter from the filter bed 12 with it.

A low level control pipe 64 extends downwardly into the backwash storage chamber 20 and has its bottom outlet communicating with the lower portion of the backwash storage chamber 20. A low level sensing switch 66 is attached to the top of the low level control pipe 64 and has a probe 68 which extends downwardly to the outlet of the pipe 64. The low level sensing switch 66 is excited or actuated when liquid in the backwash storage chamber 20 drops to a level lower than the end of the probe 68. The low level sensing switch 66 is also electrically connected with the electrical actuating means 60 as indicated diagrammatically by a line 77 connected to the line 61. When the low level sensing switch 66 is actuated, an electrical impulse is transferred to the electrical actuating means 60. This actuates the electrical actuating means 60 to close the valve 62. In this manner, when the level of filtered liquid in the backwash storage chamber 20 has dropped to a level below the end of the probe 68, at which time additional backwash water cannot flow into the tank 13, the valve 62 is closed and the service cycle of the filtering apparatus 10 begins again.

Considering the operation of the filtering apparatus 10 in more detail, during the filtering or service cycle of the filtering apparatus 10 the valve 62 is closed. In this manner, as shown in FIGURE 1, the raw liquid with entrained air passes through the inlet pipe 36 and the transfer conduit 30 into the inlet chamber 26 of the filter chamber 18. The raw liquid passes through the filter bed 12 and into the underdrain compartment 28 from which it flows upwardly through the connecting duct 48 into the compartment 92, over the weir 88 and into the compartment 94, the duct 49 and the backwash storage chamber 20. The backwash storage chamber 20 fills with filtered liquid until it has reached the level of the service outlet pipe 50 and thereafter filtered liquid flows out of the service outlet pipe 50.

The entrained air in the raw liquid is released from the raw liquid in the inlet chamber 26 of the filter chamber 18. This released air accumulates and causes a void or air space 21 in the inlet chamber 26, as shown in FIGURE 1. The amount of air that is permitted to accumulate, i.e., the size of the void space 21, is controlled by the vent pipe 75 which communicates with the inlet chamber 26 at substantially the level it is desired to maintain the liquid in the inlet chamber 26. Excess air accumulating in the inlet chamber 26 is withdrawn through the vent pipe 75.

During the service cycle, the collection of foreign material in the filter bed 12 will increase the pressure drop across the filter bed 12 and thus create a pressure differential between the inlet chamber 26 and the underdrain compartment 28. This pressure differential will be represented by a rise of the liquid in the high level sensing pipe 54. When the pressure drop across the filter media of the filter bed 12 reaches a predetermined amount, the liquid in the high level sensing pipe 54 will have risen to a point where it contacts the probe 58. This actuates the switch 56 and, accordingly, the actuating means 60 and the on-off switch means 72 causing the valve 62 to open and the blower 70 to turn on. With the valve 62 open, backwash or filtered liquid in the backwash storage chamber 20 will flow through the duct 49, the flow control means 90 and the duct 48 into the filter chamber 18 until the blower generates enough air pressure to prevent this flow of liquid. This flow of backwash water, before the gas scouring is desirable, however, as a slight fluidization of the filter bed 12 makes the subsequent gas scouring cycle more effective.

When the air pressure from the blower has built up the air will push the water level in the flow control means 90 to below that of the weir 88. The flow of the backwash water is thereby terminated. As the air pressure increases the air will pass into the underdrain compartment 28 and rapidly up through the filter media in the filter bed 12. This initiates the gas scouring cycle illustrated in FIGURE 3. The air entering the underdrain compartment 28 and passing up through the filter bed 12 travels at a relatively high velocity. The air agitates the filter bed 12 and causes the foreign particles which have collected therein to become disengaged from the filter media. As the air passes through the filter bed 12, filer media will become entrained in the air. However, the filter media will disengage from the air when the air enters the air space 21 in the upper part of the filter chamber 18. In this air space 21 the filter media entrained with the scouring air will drop back into the liquid in the filter chamber 18. The baffle 32 also assists in disengaging filter media from the scouring air. The scouring air passes out of the tank 13 through the transfer conduit 30 and the inlet pipe 36 or the vent tube 75, or both.

After a predetermined period of time, the on-off switch means 72 will automatically turn off the air blower 70. The backwash cycle begins. The filtered liquid in the backwash storage chamber 20 passes through the connecting duct 49, the flow control means 90, the duct 48, the underdrain compartment 28, the filter bed 12, the transfer conduit 30 and the drain pipe 34 to drain as shown in FIGURE 4. This flow of backwash liquid through the filter bed 12 removes the foreign material which accumulated therein during the service cycle.

When the filtered liquid stored in the backwash storage compartment 20 reaches a level below the end of the probe 68 the switch 66 is actuated whereby electrical actuating means 60 closes the valve 62. Once the valve 62 has been closed the service cycle begins and entire operation of the filter apparatus 10 being repeated. During this service cycle, the gas space 21 left after the backwashing cycle is, of course, enlarged by the release of the entrained air carried by the raw liquid. In this manner a gas space 21 is provided of sufficient size so that filter media will disengage from the scouring gas during the next gas scouring cycle.

To assure proper operation of the filter apparatus 10 the weir 88 should have an upper edge below the low level of the backwash supply, in order not to terminate the supply of backwash water before the backwash cycle was completed. The minimum height of the weir 88 must be above the level required to provide a pressure head equal to the pressure of the backwash water supply minus the pressure of the scouring gas supply to prevent the flow of backwash water over the weir 88 during the gas scouring cycle.

Referring now to FIGURES 5–7 there is illustrated a filtering apparatus 110 representing another embodiment of the present invention. The filtering apparatus 110 is generally similar to the filtering apparatus 10 and the same reference numerals have been used to identify identical parts. In effect the flow control means 90 of the filtering apparatus 10 has been replaced by a flow control means 115 comprising a duct 112 connecting the underdrain compartment 28 with a lower portion of the backwash water chamber 20. The cut 112 has an inverted U-shaped section 113, the upper portion of which communicates with the line 74 from the air blower 70. The U-shaped section 113 in conjunction with the air blower 70 prevents the flow of backwash water during the air scouring cycle as did the flow control means 90 in the filtering apparatus 10.

The operation of the filtering apparatus 110 is substantially the same as the filtering apparatus 10. During the filtering or service cycle the valve 62 is closed. The raw liquid with entrained air passes through the inlet pipe 36 and the transfer conduit 30 into the inlet chamber 26 of the filter chamber 18. The raw liquid passes through the filter bed 12 and into the underdrain compartment 28 from which it flows through the duct 112 into the backwash storage chamber 20. The backwash storage chamber 20 fills with filtered liquid until it has reached the level of the service outlet pipe 50 and thereafter filtered liquid flows out the service outlet pipe 50.

The entrained air in the raw liquid is released from the raw liquid in the inlet chamber 26 of the filter chamber 18. This released air accumulates and causes a void space 21 in the inlet chamber 26 as discussed hereinbefore with respect to the filtering apparatus 10.

During the service cycle, the collection of foreign material in the filter bed 12 will increase the pressure drop across the filter bed 12 and thus create a pressure differential between the inlet chamber 26 and the underdrain compartment 28. This pressure differential will be represented by a rise of the liquid in the high level sensing pipe 54. When the pressure drop across the filter media of the filter bed 12 reaches a predetermined amount, liquid in the high level sensing pipe 54 will have risen to a point where it contacts the probe 58. This actuates the switch 56 and, accordingly, the actuating means 60 and the on-off switch means 72 causing the valve 62 to open and the blower 70 to turn on. With the valve 62 open, backwash or filtered liquid in the backwash storage chamber 20 will flow through the duct 112 in the filter chamber 18 until the blower generates enough air pressure to prevent this flow of liquid. When the air pressure from the blower 70 has built up the air will push the water level in the U-shaped section 113 down so that it does not pass over the uppermost point of the U-shaped section 113 and no longer flows into the underdrain compartment 28, as illustrated in FIGURE 6. The flow of the backwash water is thereby terminated. As the air pressure increases the air will pass into the underdrain compartment 28 and rapidly up through the filter media in the filter bed 12. This initiates the gas scouring cycle. The air entering the underdrain compartment 28 and passing up through the filter bed 12 travels at a relatively high velocity. The air agitates the filter bed 12 and causes the foreign particles which have collected therein to become disengaged from the filter media. As the air passes through the filter bed 12, filter media will become entrained in the air. However, the filter media will disengage from the air when the air enters the air space 21 in the upper part of the filter chamber 18. In this air space 21 the filter media entrained with the scouring air will drop back into the liquid in filter chamber 18. The baffle 32 also assists in disengaging filter media from the scouring air. The scouring air passes out of the tank 13 through the transfer conduit 30 and the inlet pipe 36 or the vent tube 75, or both.

After a predetermined period of time, the on-off switch means 72 will automatically turn off the air blower 70. The backwash cycle begins. The filtered liquid in the backwash storage chamber 20 passes through the duct 113, the underdrain compartment 28, the filter bed 12, the transfer conduit 30 and the drain pipe 34 to drain, as illustrated in FIGURE 7. This flow of backwash liquid through the filter bed 12 removes the foreign material which accumulated therein during the service cycle.

When the filtered liquid stored in the backwash storage compartment 20 reaches a level below the end of the probe 68 the switch 66 is actuated whereby electrical actuating means 60 closes the valve 62. Once the valve 62 has been closed the service cycle begins and entire operation of the filter apparatus 10 being repeated. During the service cycle, the gas space 21 left after the backwashing cycle is, of course, enlarged by the release of the entrained air carried by the raw liquid. In this manner as gas space 21 is provided of sufficient size so that filter media will disengage from the scouring gas during the next gas scouring cycle.

To assure proper operation of the filter apparatus 110 the height of the upper portion of the U-shaped section 113 should not exceed the low level of the backwash supply, which would terminate the supply of backwash water before the backwash cycle was completed. The upper portion of the U-shaped section 113 must extend to a level above the level required to provide a pressure head equal to the pressure of the backwash water supply minus the pressure of the scouring gas supply to prevent the flow of backwash water over the U-shaped section 113 during the gas scouring cycle.

The filtering apparatus 10 and 110 may be used to filter water streams, sugar solutions, hydrocarbon streams and the like as will be readily appreciated by one with ordinary skill in the art. The particular filter media employed is a matter of choice, the selection of the filter media being dependent, of course, upon the liquid to be treated and the impurities contained therein. Scouring gases other than air may be employed, such as nitrogen, oxygen and the like, although air is preferred because of lower operating costs. Furthermore, the valve 62, the switches 66 and 56, the electrical actuating means 60, and the on-off mechanism 72 for the blower 70 do not per se constitute a part of the present invention, as there are a myriad of suitable means for performing the functions of these components of the filtering apparatus 10 and 110. Accordingly, one with ordinary skill in the art could select suitable valves and control means to operate the filtering apparatus 10 and 110 in accordance with the concepts of the present invention described herein.

The gas blower 70 may be placed below the point at which the service outlet pipe 50 communicates with the backwash storage compartment 20. In such instances the gas line must extend upwardly from the underdrain compartment to above the level at which the outlet pipe 50 communicates with the backwash storage compartment 20 and loop downwardly to the gas blower to prevent water flow into the blower. Preferably, the loop will extend above the level that the liquid could obtain in the filter system if operational failures occurred. In the illustrated system this would be above the inlet head box 40.

The service outlet pipe 50 may, of course, be connected directly to the connecting ducts 49 or 112. In such instances, there is a vertical extension of the connecting ducts 49 or 112 to which the outlet pipe 50 is attached. As the service cycle begins filtered liquid will enter the backwash storage chamber 20 until the liquid level therein reaches that of the outlet pipe 50. Then the filtered liquid will by-pass the backwash storage chamber 20 and go directly to the service line.

In the filtering apparatus 10 and 110 the backwash water may be obtained from a source other than a backwash storage compartment such as illustrated in FIGURES 1–7. It will be understood that any water suitable for backwash purposes may be utilized in the apparatus of the present invention. The only requirement other than that relating to the purity of the backwash water is that it have a sufficient head to flow through the flow control means 90 or 112 and upwardly through the filter bed 12 and out through the pipes 30 and 34.

If the inlet water being treated by the filtering apparatus 10 and 110 does not contain entrained air the desired air space 21 may be formed after the service cycle and before the gas scouring cycle by draining some of the liquid from the filter chamber 26 through suitable valves and piping not shown in the drawings. Furthermore, it may be desirable to increase the size of the air space 21 by draining some of the liquid from the filter chamber. It will be understood by one with ordinary skill in the art that suitable means may be afforded to automatically effect the draining of the filter tank prior to gas scouring.

What is claimed is:

1. In a filter apparatus of the type providing a service cycle, a gas scouring cycle, and a backwash cycle, and including a filter tank, backwash supply means, and means for providing a gas under pressure, said filter tank having an upper inlet side and a lower outlet side with a filter bed therebetween, and said backwash supply means supplying backwash liquor under sufficient pressure to force said liquid upwardly through said filter bed, the improvement comprising: flow control means including a closed control tank having a weir means therein, said weir means forming first and second compartments in said control tank and having a minimum height above the level required to provide a pressure head equal to the pressure of the backwash liquid minus the pressure of the gas during the scouring cycle; a first pipe means connecting said lower outlet side to said first compartment; second pipe means connecting said second compartment to said backwash supply means, said means for providing a gas under pressure having conduit means communicating with said control tank.

2. In a filter apparatus of the type providing a service cycle, a gas scouring cycle, and a backwash cycle, and including a filter tank, a backwash storage tank, and means for providing gas under pressure, said filter tank having an upper inlet side and a lower outlet side with a filter bed therebetween, and said storage tank having an upper level above said filter tank, and having an opening forming a filtrate inlet and backwash outlet, the improvement comprising: flow control means including a closed control tank having a weir means therein, said weir means forming first and second compartments in said control tank, and having an upper edge below the low level of the backwash liquid in the backwash storage tank and above the level required to provide a pressure head equal to the pressure head of the backwash liquid in said storage tank minus the pressure of the gas during the scouring cycle; first pipe means connecting said lower outlet side to said first compartment; and second pipe means connecting said second compartment with said opening in said backwash storage tank, said means for providing a gas under pressure having conduit means communicating with said control tank.

3. In a filter apparatus of the type providing a service cycle, a gas scouring cycle, and a backwash cycle and including a filter tank, a backwash supply means, and means for providing a gas under pressure, said filter tank having an upper inlet side and a lower outlet side with a filter bed therebetween, and said backwash supply means supplying backwash liquid under sufficient pressure to force said liquid upwardly through said filter bed, the improvement comprising: flow control means including a pipe having an inverted U-shaped section connecting said lower outlet side with said backwash supply means and extending upwardly to a level above the level required to provide a pressure head equal to the pressure of the backwash liquid minus the pressure of the gas during the scouring cycle, said means for providing a gas under pressure having conduit means communicating with an upper portion of said inverted U-shaped section.

4. In a filter apparatus of the type providing a service cycle, a gas scouring cycle, and a backwash cycle, and including a filter tank, a backwash storage tank, and means for providing a gas under pressure, said filter tank having an upper inlet side and a lower outlet side with a filter bed therebetween, and said storage tank having an upper level above said filter tank and having an opening forming a filtrate inlet and backwash outlet, the improvement comprising: flow control means including a pipe means having an inverted U-shaped section connecting said lower outlet side with said opening in said backwash storage tank and extending upwardly to a level below the low level of the backwash liquid in the backwash storage tank and above the level required to provide a pressure head equal to the pressure head of the backwash liquid in said storage tank minus the pressure of the gas during the scouring cycle, said means for providing a gas under pressure having conduit means communicating with an upper portion of the inverted U-shaped section.

5. In a filter apparatus of the type providing a service cycle, a gas scouring cycle, and a backwash cycle, and including a filter tank, a backwash storage tank positioned above said filter tank, and means for providing a gas under pressure, said filter tank having an upper inlet side and a lower outlet side with a filter bed therebetween, and having an opening forming a filtrate inlet and backwash outlet, the improvement comprising: flow control means including a closed control tank having a weir means therein positioned below the backwash outlet of said storage tank, said weir means forming first and second compartments in said control tank; first pipe means connecting said lower outlet side to said first compartment; and second pipe means connecting said second compartment with said backwash storage tank, said means for providing a gas under pressure having conduit means communicating with said control tank, and said weir means having a height to prevent the flow of backwash liquid to said filter tank during the gas scouring cycle and to permit the flow of backwash liquid to said filter tank during the backwash cycle.

6. In a filter apparatus of the type providing a service cycle, a gas scouring cycle, and a backwash cycle, and including a filter tank, a backwash storage tank positioned above said filter tank, and means for providing a gas under pressure, said filter tank having an upper inlet side and a lower outlet side with a filter bed therebetween, and said storage tank having an opening forming a filtrate inlet and backwash outlet, the improvement comprising: flow control means including a pipe having an inverted U-shaped section having an upper end below the backwash outlet of said storage tank and connecting said lower outlet side with said backwash storage tank, said means for providing a gas under pressure having conduit means communicating with an upper portion of the inverted U-shaped section, and said pipe means having an upper level of sufficient height to prevent the flow of backwash liquid from said storage tank to said filter tank during the gas scouring cycle and to permit the flow of backwash liquid to said filter tank during the backwash cycle.

References Cited

UNITED STATES PATENTS

| | | | |
|---|---|---|---|
| 2,746,605 | 5/1956 | Baum | 210—137 |
| 2,879,891 | 3/1959 | Beohner et al. | 210—277 X |
| 2,879,893 | 3/1959 | Stebbins | 210—108 |
| 3,017,247 | 1/1962 | Huxley | 210—98 X |
| 3,111,486 | 11/1963 | Soriente | 210—108 |
| 3,260,366 | 7/1966 | Duff et al. | 210—108 X |
| 3,342,334 | 9/1967 | Soriente et al. | 210—108 |

FOREIGN PATENTS

| | | |
|---|---|---|
| 578,811 | 7/1946 | Great Britain. |
| 95,596 | 10/1960 | Netherlands. |

REUBEN FRIEDMAN, *Primary Examiner.*

JOHN ADEE, *Assistant Examiner.*

U.S. Cl. X.R.

210—274, 277